July 13, 1943.  F. G. BEETEM  2,324,188
SIGNAL MEANS FOR BATTERY CHARGING CIRCUITS
Filed March 6, 1940

WITNESS:
Robt R Mitchel

INVENTOR
Frank G. Beetem
BY
Augustus B Stoughton
ATTORNEY.

UNITED STATES PATENT OFFICE 2,324,188

SIGNAL MEANS FOR BATTERY CHARGING CIRCUITS

Frank G. Beetem, Philadelphia, Pa., assignor to The Electric Storage Battery Company, Philadelphia, Pa., a corporation of New Jersey Application March 6, 1940, Serial No. 322,430

8 Claims. (Cl. 177—311)

The principal object of the present invention is to provide simple, comparatively inexpensive and reliable means for automatically operating a signal in response to the interruption of current in a charging circuit of a storage battery charged from an alternating current circuit or supply line.

Other objects of the invention will appear from the following description at the end of which the invention will be claimed.

Generally stated the invention comprises a lamp circuit including an impedance and the variable inductance of a saturable reactor, a lamp or the like connected across a portion of the circuit and responsive to the voltage thereof, and a saturating coil for the saturable reactor inserted in the battery charging circuit.

The invention also comprises the improvements to be presently described and finally claimed.

Figure 1:
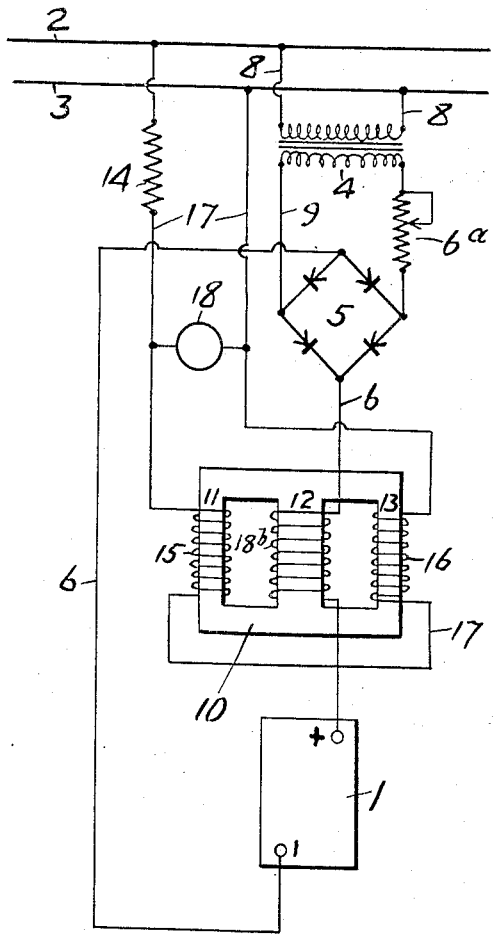
Figure 2:
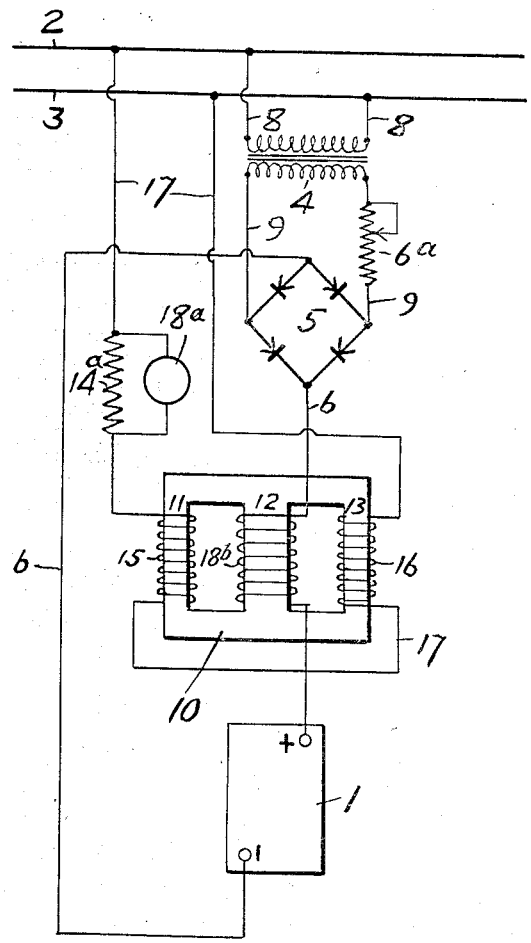

In the following description reference will be made to the accompanying drawing forming part hereof and in which:

Figure 1 is a diagrammatic view illustrating the arrangement of parts for lighting a signal lamp when the charging circuit is interrupted, and Figure 2 is a similar view showing an arrangement in which the signal lamp is extinguished when the charging circuit is interrupted.

Referring to Figure 1, charging current is supplied to the storage battery 1 from the alternating current line 2—3 through the transformer 4 and a rectifier 5. A controlling resistance 6ª is shown between the rectifier and the transformer. 6 indicates the conductors leading from the rectifier 5 and including the battery 1. 8 indicates conductors for connecting the primary winding of the transformer 4 across the alternating current lines 2—3. 9 indicates the circuit for connecting the rectifier 5 to the secondary of the transformer 4. 10 indicates a saturable reactor shown as having a magnetic circuit consisting of three parallel legs 11, 12 and 13. On the middle leg 12 is wound a coil 18ᵇ connected into the charging circuit 6 of the battery. Direct current in this coil saturates the iron of the magnetic circuit. On the outer legs 11 and 13 of the magnetic circuit are two coils 15 and 16 connected in series with the resistance 14 and across the alternating current line 2—3. The circuit is indicated by 17. These coils 15 and 16 constitute a reactance which varies with the saturation of the iron. A signal lamp 18 is connected across the circuit 17 in parallel with the coils 15 and 16, the connection on one side of the lamp being in the circuit between the resistance 14 and the coils 15 and 16.

The mode of operation may be described as follows: When charging current is flowing through the coil 18ᵇ on the middle leg 12 of the saturable reactor 10, the reactance of the coils 15 and 16 on the two outside legs 11 and 13 will be low, and considerable current will flow through the circuit 17, producing a voltage drop in the resistance 14 which will reduce the voltage across the signal lamp to a point where it will not be visible. If the current in the charging circuit 6 is interrupted, either by an open circuit or by failure of the rectifier 5 or the transformer 4, the iron in the magnetic circuit of the saturable reactor will no longer be saturated and the inductance of the coils 15 and 16 on the outside legs will be high, permitting very little current to flow through the circuit. This will reduce the voltage drop in the resistance 14, causing a comparatively high voltage, but little below that of the alternating current supply line 2—3, to be applied to the signal light, which will therefore give an indication by showing light.

The arrangement and construction of the modification shown in Figure 2 are as above described except that the signal lamp 18ª is connected in parallel with the resistance 14, instead of being across the circuit as shown in Figure 1. As long as there is charging current flowing into the battery and saturating the iron of the saturable reactor 10, the reactance of the outside coils 15 and 16 will be low and considerable current will flow through the circuit 17, producing a voltage drop in the resistance 14ª sufficient to light the signal lamp. If the charging current is interrupted, the reactance of the outside coils 15 and 16 on the saturable reactor 10 will be high and very little current will flow through the circuit 17 and the signal light will go out.

While the element 14 is referred to as a resistance, other types of impedance, including reactance, may be used. Also, the battery may be charged from any suitable source of direct current, and not necessarily from the alternating current circuit to which the signal lamp circuit is connected.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. For battery-charging means including a battery-charging circuit and its transformer and rectifier connected across an alternating current line, signalling provisions indicating an interruption of current in the charging circuit and comprising, a signal lamp having terminals, an impedance element, a saturable core reactor having reactance coils and having a saturating coil in the battery charging circuit, and other circuit means relating the lamp terminals, the impedance, and the reactance coils to each other to effect the result that interruption of the charging current causes variation of the voltage at the lamp terminal.

2. For battery-charging means including a battery-charging circuit and its transformer and rectifier connected across an alternating current line, signalling provisions indicating an interruption of current in the charging circuit and comprising, a signal lamp circuit connected across the alternating current line and including a resistance, a lamp connected to the lamp circuit and responsive to the voltage across the resistance thereof, and a saturable reactor having series reactance coils interposed in the lamp circuit and a saturating coil in the battery-charging circuit.

3. For battery-charging means including a battery-charging circuit and its transformer and rectifier connected across an alternating current line, signalling provisions comprising, a signal lamp circuit connected across the alternating current line and including a resistance, a lamp connected across said lamp circuit and responsive to the voltage drop in the resistance, a saturable reactor having three legs, a pair of coils on the outside legs and connected in the lamp circuit, and a coil on the middle leg connected in the battery-charging circuit.

4. In a battery charging circuit in which the battery is maintained in a fully charged state, a battery, an alternating current source, a direct current source of charging current, means for connecting said direct current source and said battery in series, and means for indicating an interruption of charging current due to failure of any circuit connections, said means comprising an impedance, an indicating lamp connected to said impedance so as to be affected by the voltage drop across said impedance, a saturable reactor, a reactance winding on said reactor connected in series with said impedance across said alternating current source, and a direct current saturating winding on said reactor energized in accordance with the flow of charging current from said direct current source to said battery, whereby an interruption of the charging current for any reason changes the voltage drop across said impedance to produce an indication by said lamp.

5. In a battery charging circuit in which the battery is maintained in a fully charged state, a battery, an alternating current source, a direct current source of charging current energized from said alternating current source, means for connecting said direct current source and said battery in a series circuit, and means for indicating an interruption of the charging current flowing in said series circuit, said means comprising an impedance connected to said alternating source, an indicating lamp connected in series with said impedance across said alternating current source, a saturable reactor, a reactance winding on said reactor connected in series with said impedance across said alternating current source but in shunt with said indicating lamp, and a direct current saturating winding on said reactor energized in accordance with the flow of charging current from said direct current source to said battery, whereby upon an interruption of the charging current the current flowing through said circuit including said reactance and impedance in series will be reduced and the voltage drop across said impedance will be correspondingly diminished, thereby causing a voltage to be impressed across said indicating lamp of a sufficient value to light said lamp.

6. In a battery charging circuit in which the battery is maintained in a fully charged state, a battery, an alternating current source, a direct current source of charging current energized from said alternating current source, means for connecting said direct current source and said battery in a series circuit, and means for indicating an interruption of the charging current flowing in said series circuit, said means comprising an impedance connected to said alternating current source, an indicating lamp connected in shunt across said impedance, a saturable reactor, a reactance winding on said reactor connected in series with said impedance across said alternating current source, and a direct current saturating winding on said reactor energized in accordance with the flow of charging current from said direct current source to said battery, whereby upon an interruption of the charging current, the inductance of said reactance winding increases, reducing the flow of current in said circuit comprising said reactance and impedance in series an amount sufficient to cause said shunt connected indicating lamp to be extinguished.

7. Battery-charging means including, in combination, an uninterrupted battery-charging D. C. circuit, an alternating current line, an uninterrupted signal-lamp circuit connected across the alternating current line, a saturable reactor having series reactance coils interposed in the lamp circuit, a saturating coil interposed in the battery-charging circuit and responsive to a small current in said circuit to saturate said reactor, an impedance in the lamp circuit and of which the voltage-drop decreases in response to the increased impedance of the series reactance coils when the charging current in the saturating coil is interrupted, and a signal lamp connected with the lamp circuit and which responds to change in voltage-drop across the impedance.

8. For battery charging means including a battery charging circuit and its transformer and rectifier connected across the conductors of an alternating current line, signalling provisions for indicating an interruption of current in the charging circuit comprising, a saturable core reactor having reactance coils and having a saturating coil in the battery charging circuit, a signal actuating circuit connected across the alternating current line, said circuit including in series connection a resistor and the reactance coils of the saturable reactor, and a signal lamp having two terminals one of which is connected to one of the conductors of the A. C. circuit and the other of which is connected to a point in the signal actuating circuit between the resistor and the reactance coils whereby interruption of the charging current causes variation of the voltage at the lamp terminals.

FRANK G. BEETEM.